US011167287B2

(12) United States Patent
Roper et al.

(10) Patent No.: US 11,167,287 B2
(45) Date of Patent: Nov. 9, 2021

(54) DISSOLVING DROPLET MICROFLUIDIC PARTICLE ASSEMBLY DEVICES AND METHODS, AND PARTICLE ASSEMBLIES OBTAINED THEREFROM

(71) Applicant: HRL Laboratories, LLC, Malibu, CA (US)

(72) Inventors: Christopher S. Roper, Oak Park, CA (US); Adam F. Gross, Santa Monica, CA (US); Shanying Cui, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 249 days.

(21) Appl. No.: 16/411,058

(22) Filed: May 13, 2019

(65) Prior Publication Data

US 2020/0030802 A1 Jan. 30, 2020

Related U.S. Application Data

(60) Provisional application No. 62/711,724, filed on Jul. 30, 2018.

(51) Int. Cl.

*B01L 3/00* (2006.01)
*B01F 3/08* (2006.01)
*B82Y 30/00* (2011.01)

(52) U.S. Cl.

CPC ...... *B01L 3/502761* (2013.01); *B01F 3/0807* (2013.01); *B01L 2200/0652* (2013.01); *B01L 2300/0861* (2013.01); *B82Y 30/00* (2013.01)

(58) Field of Classification Search

CPC ....... B01F 13/0062; B01F 3/0807; B01J 2/06; B01L 2200/0652; B01L 2300/0861;

(Continued)

(56) References Cited

U.S. PATENT DOCUMENTS 6,450,189 B1 9/2002 Ganan-Calvo
9,981,240 B1 5/2018 Roper et al.

(Continued)

FOREIGN PATENT DOCUMENTS

GN 105602545 A 5/2015
WO 2016157742 A1 10/2016

OTHER PUBLICATIONS

Lee et al, Temperature controlled tensiometry using droplet microfluidics, published Jan. 24, 2017, Lab Chip, 2017, 17, 717 (Year: 2017).*

(Continued)

*Primary Examiner* — Jennifer Wecker
*Assistant Examiner* — Jonathan Bortoli
(74) *Attorney, Agent, or Firm* — O'Connor & Company

(57) ABSTRACT

Some variations provide a device for assembling a plurality of particles into particle assemblies, comprising: (a) a microfluidic droplet-generating region; (b) a first inlet to the droplet-generating region, configured to feed a first fluid containing particles and a solvent for the particles; (c) a second inlet to the droplet-generating region, configured to feed a second fluid that is not fully miscible with the first fluid; (d) a droplet outlet from the droplet-generating region, configured to withdraw droplets of the first fluid dispersed in the second fluid; and (e) a droplet-dissolving region configured to remove solvent from the droplets, thereby forming particle assemblies. Some variations also provide an assembly of nanoparticles, wherein the assembly has a volume from 1 $\mu m^3$ to 1 $mm^3$, a packing fraction from 20% to 100%, and/or an average relative surface roughness less than 1%, wherein the assembly is not disposed on a substrate.

28 Claims, 9 Drawing Sheets

(58) Field of Classification Search
CPC ......... B01L 3/502761; B01L 3/502784; B82Y 30/00; B82Y 40/00
See application file for complete search history.

(56) References Cited

U.S. PATENT DOCUMENTS

| | | | |
|---|---|---|---|
| 2008/0213593 | A1 | 9/2008 | Subramaniam et al. |
| 2012/0309904 | A1 | 12/2012 | Xu et al. |
| 2014/0065234 | A1 | 3/2014 | Shum et al. |
| 2015/0280241 | A1 | 10/2015 | Hara et al. |
| 2016/0051958 | A1 | 2/2016 | Kung et al. |
| 2016/0139090 | A1 | 5/2016 | Schoonen et al. |

OTHER PUBLICATIONS

Doncom et al, Dispersity effects in polymer self-assemblies: a matter of hierarchical control, publsihed Jun. 9, 2017, Chem. Soc. Rev., 2017, 46, 4119 (Year: 2017).*

PCT/US2019/032095 International Search Report and Written Opinion dated Sep. 11, 2019.

Cho et al., "Microwave-Assisted Self-Organization of Colloidal Particles Inside Water-in-Oil Emulsions" Journal of Dispersion Science and Technology, 31:169-176, 2010.

Zhang et al., "Self-Assembly Kinetics of Colloidal Particles inside Monodispersed Micro-Droplet and Fabrication of Anisotropic Photonic Crystal Micro-Particles" Crystals 2016, 6, 122; doi:10.3390/cryst6100122.

Wang et al., "Droplet Microfluidics for the Production of Microparticles and Nanoparticles" Micromachines 2017, 8, 22; doi:10.3390/mi8010022.

Su et al., "One-step fabrication of silica colloidosomes with in situ drug encapsulation" RSC Advances (RSC Publishing) RSC Adv., 2016, 6, 112292-112299 DOI:10.1039/C6RA19048K.

Wintzheimer et al., "Supraparticles: Functionality from Uniform Structural Motifs" ACS Nano 2018, 12, 5093-5120.

PCT/US2019/032100 International Search Report and Written Opinion dated Apr. 21, 2020.

* cited by examiner

DISSOLVING DROPLET MICROFLUIDIC PARTICLE ASSEMBLY DEVICES AND METHODS, AND PARTICLE ASSEMBLIES OBTAINED THEREFROM

PRIORITY DATA

This patent application is a non-provisional application claiming priority to U.S. Provisional Patent App. No. 62/711,724, filed on Jul. 30, 2018, which is hereby incorporated by reference herein.

STATEMENT REGARDING FEDERALLY SPONSORED RESEARCH OR DEVELOPMENT

This invention was made with Government support under DARPA Contract No. FA8650-15-C-7549. The Government has certain rights in this invention.

FIELD OF THE INVENTION

The present invention generally relates to devices and methods for assembling particles using droplet microfluidics.

BACKGROUND OF THE INVENTION

Droplet-based microfluidic systems have been shown to be compatible with many chemical reagents and capable of performing a variety of operations that can be rendered programmable and reconfigurable. This platform has dimensional scaling benefits that have enabled controlled and rapid mixing of fluids in the droplet reactors, resulting in decreased reaction times. Another benefit is the precise generation and repeatability of droplet operations. Droplet-based systems focus on creating discrete volumes with the use of immiscible phases. Microfluidic systems are normally characterized by the low-Reynolds number flow regime which dictates that all fluid flow is essentially laminar.

Tightly packed, organic-free arrays of nanoparticles are useful for optical, magnetic, electronic device, and pharmaceutical applications, among others. Applications include drive motors, windshield wiper motors, starter motors, pumps, and actuation devices. The macroscopic assembly of magnetic nanoparticles is useful for such magnetic devices. Furthermore, assemblies of nanoparticles are useful for altering the wetting and icing on surfaces as well as for creating optically scattering or diffractive coatings, useful for cameras, for example. Micron-sized lenses, prisms, and retroreflectors are useful for chip-scale infrared and visible optics. There is no way to grind lens materials down to 10 micron sizes, for example.

There are existing approaches for forming packed nanoparticles, but they do not form these assemblies in solution without organic ligands. That is, arrays of nanoparticles from crystallization methods are usually surrounded by organic ligands that interfere with further chemical processing and can limit durability. Organic ligands typically melt from heat and darken in the presence of light. This lack of thermal and optical stability makes avoiding organic ligands crucial for environmentally robust structures.

Also, existing approaches for forming packed nanoparticles do not form microassemblies with a high degree of perfection (smoothness and sphericity) and size selectivity.

Agglomerated nanoparticles may be formed without organic ligands by adjusting the pH of a solution of dispersed nanoparticles with an acid or base solution to near the isoelectric point of the nanoparticles. However, these nanoparticles will not be tightly packed.

Nanoparticles may be formed in an array requiring a substrate. In these approaches, nanoparticles are packed via drying from a solution (colloidal crystals) or electrophoresis, both requiring a substrate. Colloidal crystals are formed by dispersing colloids in a solution and drying on a substrate or spin coating on a substrate. Moreover, electrophoresis does not always result in tightly packed nanoparticles.

Arrays of nanoparticles may be grown in an array on a substrate from a process with gaseous reactants. Arrays of nanoparticles may be formed through a wet chemical process. In one approach, metals or oxides are deposited in the pores of anodic alumina or mesoporous silica. This approach forms either single layers of nanorods or nanorods that have empty space between them and no material between the rods. This results in a low density of material and reduced efficacy from the array.

The packed arrays of nanoparticles, as taught in the prior art, tend to be non-uniform in array size and shape. In order to be useful in larger devices, arrays of assembled particles should be uniform in size and shape. This is necessary for either bottom-up assembly processes, such as self-assembly into larger assemblies; for top-down assembly processes, such as pick-and-place assembly onto patterned substrates; or for combinations of bottom-up and top-down assembly.

There is a desire for monodisperse, tightly packed, smooth, and organic ligand-free microassemblies of nanoparticles. These microassemblies will be useful for optical, magnetic, and electronic device applications, among others.

SUMMARY OF THE INVENTION

The present invention addresses the aforementioned needs in the art, as will now be summarized and then further described in detail below.

Some variations provide a device for assembling a plurality of particles into particle assemblies, the device comprising:

(a) a microfluidic droplet-generating region;

(b) a first inlet to the droplet-generating region, wherein the first inlet is configured to feed a first fluid containing particles and a solvent for the particles;

(c) a second inlet to the droplet-generating region, wherein the second inlet is configured to feed a second fluid that is not fully miscible with the first fluid;

(d) a droplet outlet from the droplet-generating region, wherein the droplet outlet is configured to withdraw droplets of the first fluid dispersed in the second fluid; and (e) a droplet-dissolving region configured to receive the droplets from the droplet outlet, wherein the droplet-dissolving region is configured to remove the solvent from the droplets, thereby forming particle assemblies.

In some embodiments, the device further comprises a third inlet to the droplet-generating region, wherein the third inlet is configured to feed the second fluid. Additional inlets may be included in the device, if desired.

In some embodiments (e.g., during device operation), the droplet-generating region contains the first fluid and the second fluid. The droplet-dissolving region may contain a third fluid that is different than the first fluid, wherein the first fluid is partially soluble in the third fluid. The third fluid may be the same as, or different than, the second fluid.

In some embodiments, the droplet-dissolving region is configured with agitation, such as stirring, shaking, rolling, sonication, or a combination thereof.

In some embodiments, a temperature-control component is in thermal communication with the device or with a region of the device. A temperature-control component may be a cooler, heater, or a heat exchanger capable of cooling and heating, for example. Multiple temperature-control components may be used.

Some variations of the invention provide a method of assembling a plurality of particles into particle assemblies, the method comprising:

(a) obtaining a first fluid containing particles and a solvent for the particles;

(b) obtaining a second fluid, wherein the first fluid is not fully miscible in the second fluid;

(c) obtaining a third fluid, wherein the first fluid is partially soluble in the third fluid;

(d) introducing the first and second fluids into a microfluidic droplet-generating region, thereby generating an emulsion containing a dispersed phase of droplets of the first fluid in the second fluid;

(e) introducing the emulsion to a droplet-dissolving region containing the third fluid; and (f) dissolving the solvent from the droplets into the third fluid, thereby forming particle assemblies.

In some embodiments, the first fluid has a solubility in the second fluid from 0 vol % (completely immiscible) to about 20 vol %.

In some embodiments, the third fluid is the same as the second fluid. In other embodiments, the third fluid is different than the second fluid. In certain embodiments, the third fluid is a mixture containing one component that is the same as the second fluid and another component that is a different molecule.

In some methods, the droplet-dissolving region is configured with agitation, such as stirring, shaking, rolling, sonication, or a combination thereof.

In some embodiments, the temperature of the first fluid, the temperature of the second fluid, and/or the temperature of the third fluid are controlled with one or more temperature-control components (e.g., heaters or coolers).

Steps (d), (e), and (f) may be continuous. In some embodiments, the flow rate of the second fluid is at least ten times the flow rate of the first fluid.

In some embodiments, the method further comprises adjusting pH of the first fluid, prior to step (d). Adjustment of pH may be done for particle suspendibility, to inhibit electrostatic assembly, or to induce multi-particle co-assembly, for example.

In some embodiments, the assembly (size) dispersity index of the particle assemblies is less than 0.1. In these or other embodiments, in step (f), the number of the particle assemblies equals the number of the droplets.

Preferably, the method does not utilize a substrate for making the particle assemblies.

In some methods, the particles include first particles and second particles, wherein the second particles (e.g., microparticles) are larger than the first particles (e.g., nanoparticles), and wherein the particle assemblies are core-shell particle assemblies.

Variations of the invention also provide an assembly of nanoparticles, wherein the assembly has a volume from 1 $\mu m^3$ to 1 $mm^3$, a packing fraction from 20% to 100%, and/or an average relative surface roughness less than 5%, wherein the assembly is preferably not disposed on a substrate.

In some embodiments, the assembly packing fraction is at least 90%.

In some embodiments, the average relative surface roughness of the assembly is less than 1% or less than 0.1%.

The assembly may be spherical or non-spherical. In some embodiments, the assembly has an aspect ratio of at least 1.2.

In some embodiments, the assembly is a core-shell assembly.

In various embodiments, the assembly contains a material selected from the group consisting of metals, metal oxides, metal fluorides, metal sulfides, metal phosphides, semiconductors, ceramics, glasses, polymers, and combinations thereof. The assembly is preferably free of organic ligands.

DETAILED DESCRIPTION OF EMBODIMENTS OF THE INVENTION

Figure 1:
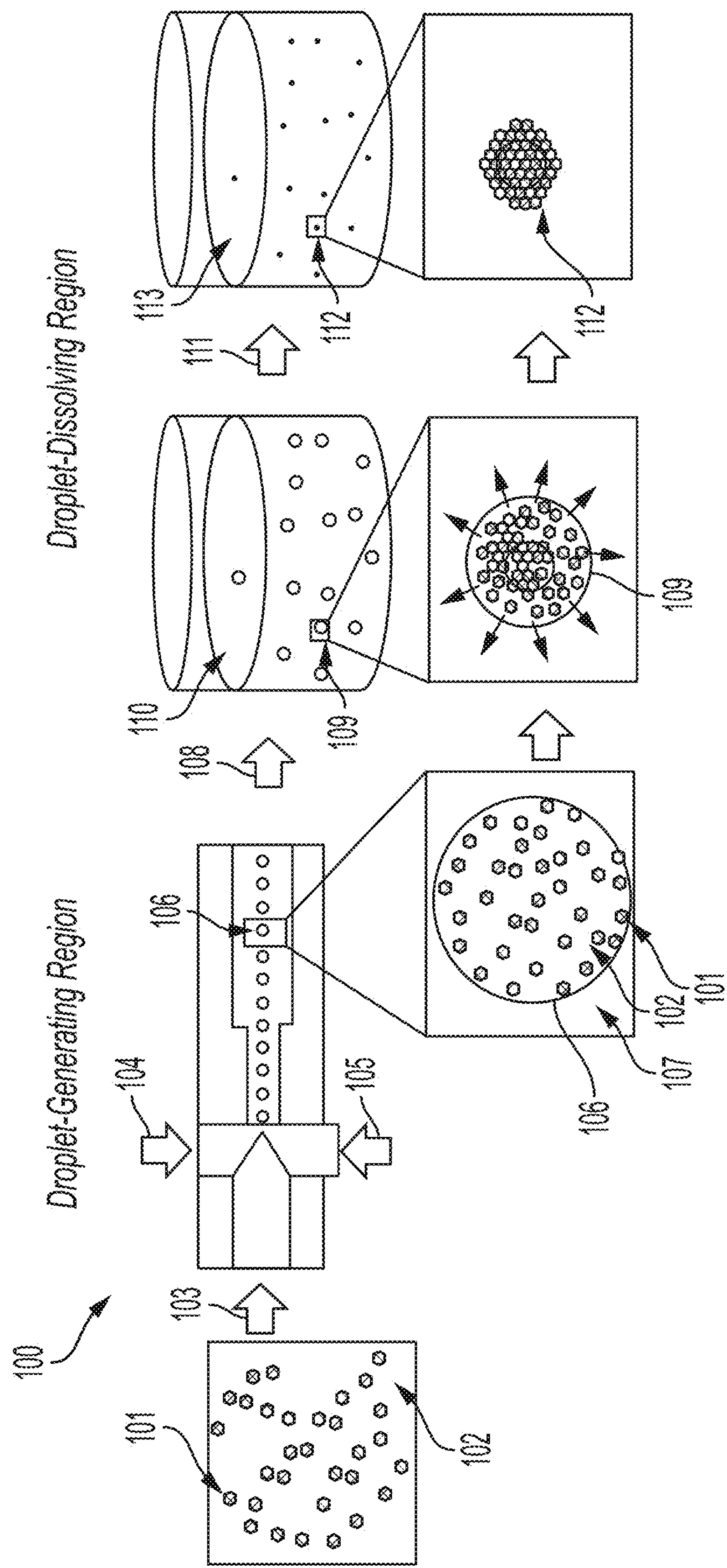
FIG. 1 is a schematic diagram of a microfluidic device for assembling a plurality of particles into particle assemblies, in some embodiments.

The devices, systems, structures, methods, and compositions of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

Some variations of the present invention provide devices and methods for assembling particles into tightly packed structures with controlled order and complexity. A droplet microfluidic device is combined with dissolving-droplet assembly of particles. A microfluidic droplet-generating region is configured to create controlled droplet reaction volumes, enabling uniform microassemblies at fast assembly rates, such as $10^9$ particles/second, or higher. Furthermore, the devices and methods are amenable to the addition of complex features to the microassemblies, such as nanoparticle shells or assembly in confined spaces to form complex morphologies.

Some variations of the present invention provide monodisperse, tightly-packed, smooth, and organic ligand-free microassemblies of nanoparticles. Because droplet microfluidics are utilized to generate the emulsion of droplets, more-monodisperse microassemblies are achieved. In some embodiments, the microassemblies are highly spherical, even when the nanoparticles are asymmetric. In some embodiments, the microassemblies are non-spherical. In some embodiments, core-shell microassemblies are provided.

In some embodiments, microassemblies of nanoparticles are utilized for pharmaceutical manufacture.

The smoothness achievable with the devices and methods of the invention makes these materials useful as optical components, such as wavelength-specific scatterers, lenses, prisms, and retroreflectors. For example, assembling optical components from nanoparticles enables (i) the use of materials such as laser glasses $LiYF_4$ and $NaYF_4$ that are difficult to grow in large volumes and (ii) the fabrication of micro-optics at a length scale smaller than is possible with traditional machining and polishing. The principles of the invention enable a bottom-up process to produce micro-sized infrared lens materials (e.g., lenses less than 10 microns in thickness).

In preferred embodiments that do not employ organic ligands, infrared-transparent lens materials or other infrared optics may be fabricated, with the benefit that there are no infrared absorptions from organic ligands.

Some variations provide a device for assembling a plurality of particles into particle assemblies, the device comprising:

(a) a microfluidic droplet-generating region;

(b) a first inlet to the droplet-generating region, wherein the first inlet is configured to feed a first fluid containing particles and a solvent for the particles;

(c) a second inlet to the droplet-generating region, wherein the second inlet is configured to feed a second fluid that is not fully miscible with the first fluid;

(d) a droplet outlet from the droplet-generating region, wherein the droplet outlet is configured to withdraw droplets of the first fluid dispersed in the second fluid; and (e) a droplet-dissolving region configured to receive the droplets from the droplet outlet, wherein the droplet-dissolving region is configured to remove the solvent from the droplets, thereby forming particle assemblies.

In the device, a "region" may be a sub-system, a reactor, a pipe, a tube, a section (e.g., of a pipe or tube), a container, or a portion thereof, or a combination thereof. Multiple elements may collectively form a single region; for example, a tube outlet and a container disposed in flow communication with the tube outlet, may collectively form a region of the device. A portion of an element may form a region; for example, a section of pipe may form a region of the device.

The solvent for the particles, in the first fluid, may be selected from the group consisting of water, formamide, alkyl formamide (e.g., methyl formamide), dialkyl formamide (e.g., dimethyl formamide), dialkyl sulfoxide (e.g., dimethyl sulfoxide), isopropanol or another alcohol (e.g., methanol, ethanol, 1-propanol, isobutanol, 1-butanol, 2-butanol, or t-butanol), acetonitrile, acetone, tetrahydrofuran, and combinations thereof, for example. The solvent preferably contains water. In some embodiments, the solvent consists essentially of water, allowing for impurities in the water.

A pH-adjustment substance may be included in the first fluid. A pH-adjustment substance is a chemical that adjusts the pH of a solution, either down (more acidic) or up (more alkaline). The pH-adjustment substance may be an acid or a base.

The first fluid contains the particles to be assembled. The concentration of particles in the first fluid may be from about 1 mg/mL to about 100 mg/mL, such as about 5, 10, 20, 30, 40, 50, 60, 70, 80, or 90 mg/mL. Concentrations lower than 1 mg/mL or higher than 100 mg/mL are possible, depending on the rate of assembly, the type of particles, and the desired final microassemblies.

In some embodiments, the average size of the particles is from about 1 nanometer to about 100 microns. The "average size" is the average diameter for spherical particles or the average effective diameter for non-spherical particles (effective diameter is the cube root of $6V/\pi$, where V is the particle volume). In certain embodiments, the particles are nanoparticles with an average size from about 1 nanometer to about 1000 nanometers, such as from about 5 nm to about 1000 nm, about 10 nm to about 1000 nm, about 50 nm to about 1000 nm, or about 100 nm to about 1000 nm. In certain preferred embodiments, all of the particles are nanoparticles. The particle size is the particle diameter for spherical particles, or length or effective diameter for other particle geometries. In some embodiments, all of the particles have substantially similar size.

Particles sizes may be measured by a variety of techniques, including dynamic light scattering, laser diffraction, image analysis, or sieve separation, for example. Dynamic light scattering is a non-invasive, well-established technique for measuring the size and size distribution of particles typically in the submicron region, and with the latest technology down to 1 nanometer. Laser diffraction is a widely used particle-sizing technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate particle sizes and distributions can be done directly on photomicrographs, scanning electron micrographs, or other images. Finally, sieving is a conventional technique of separating particles by size.

Generally, nanoparticles may be round, cylindrical, elliptical, diamond-shaped, tetragonal, tetragonal bipyramidal, cubic, or hexagonal prism structures wherein the ratio between the shortest and longest dimension is 1:1 to 1:5. The nanoparticles may be symmetric or asymmetric. A mixture of solvents in the discrete phase is preferred for assembly of asymmetric nanoparticles.

The particles may be selected from the group consisting of metals, ceramics, glasses, and polymers; oxides, fluorides, sulfides, or phosphides thereof; and combinations of the foregoing. For example, the particles may include oxides, fluorides, sulfides, or phosphides of a metal or metalloid. In the case of particles containing polymers, the polymers may be insulators, semiconductors, or conductors (i.e., intrinsically conducting polymers).

The particles may contain charged surface groups to enable the particles to be dispersed in a solvent. For example, charged surface groups may be selected from thiocyanate ($SCN^-$), borofluoride (e.g., tetrafluoroborate, $BF_4^-$), or hexafluorophosphate ($PF_6^-$).

In preferred embodiments, fully formed particles are provided for purposes of assembly, rather than combining the synthesis of the particles with the assembly process.

In some embodiments, the particles include more than one type of material. For example, the particles may have a core-shell configuration with one material in the core and a different material in the shell.

In certain embodiments, the particles are Janus particles with two distinct materials present in each particle, such that each particle surface has two or more distinct physical properties.

The first fluid and second fluid are not fully miscible with each other. In some embodiments, the first fluid is completely insoluble in the second fluid. In other embodiments, the first fluid is slightly soluble in the second fluid. The first fluid is preferably from about 0 vol % to about 20 vol % soluble in the second fluid, more preferably from about 0.1 vol % to about 15 vol % soluble in the second fluid, and most preferably from about 1 vol % to about 10 vol % soluble in the second fluid. These percentages are on a volume/volume basis, i.e. calculated as the volume of the first fluid that dissolves in a given volume of the second fluid.

The second fluid may be an alcohol, an ester (e.g., an aliphatic ester, such as but not limited to methyl laurate), a ketone, an alkane, or a cyclic alkane, for example. In some embodiments, the second fluid is selected from the group consisting of methyl laurate, 1-butanol, t-butanol, 1-octanol, 1-hexanol, 1-decanol, ethyl ether, dibutyl ether, dihexyl ether, dioctyl ether, methyl t-butyl ether, methyl ethyl ketone, methyl amyl ketone, cyclohexane, ethyl acetate, and combinations thereof.

The microfluidic droplet-generating region may be selected from a flow-focusing device or configuration, a T-junction device or configuration, a dielectrophoresis droplet-generating device or configuration, or an electrowetting on dielectric (EWOD) device or configuration. This specification hereby incorporates by reference herein Teh et al., "Droplet Microfluidics" *Lab Chip,* 2008, 8, 198-220.

In a flow-focusing configuration, the dispersed and continuous phases are forced through a narrow region in the microfluidic device. Symmetric shearing by the continuous phase on the dispersed phase enables more controlled and stable generation of droplets. Properties such as channel geometry, flow rate, and viscosity all play important roles in controlling droplet generation.

In a T-junction device or configuration, the inlet channel containing the dispersed phase perpendicularly intersects the main channel which contains the continuous phase. The two phases form an interface at the junction, and as fluid flow continues, the tip of the dispersed phase enters the main channel. The shear forces generated by the continuous phase and the subsequent pressure gradient cause the head of the dispersed phase to elongate into the main channel until the neck of the dispersed phase thins and eventually breaks the stream into a droplet. The sizes of the droplets can be changed by altering the fluid flow rates, the channel widths, or the relative viscosity between the two phases. T-Junctions are not limited to single inlets.

Dielectrophoresis can be used to generate uniform droplets by pulling the droplets from a fluid reservoir. The fluid can be electrically neutral, and the force exerted on the uncharged fluid is caused by a non-uniform electric field. The operation principle behind dielectrophoresis-driven droplet formation is based on the phenomenon that polarizable fluids will be attracted to areas of higher electric field intensity. Dielectrophoresis functions through the contribution of three main forces: a wetting force on the interfacial line between the droplet, its surrounding medium, and the surface it contacts; a force on the interface of the two fluids; and a body force due to pressure gradients in the fluid. The size and uniformity of the droplets depend on the magnitude and the frequency of the applied voltage. The droplets do not need to be in contact with a surface, but the droplets should include a liquid of higher dielectric permittivity than its surrounding fluid.

In an electrowetting on dielectric (EWOD) device or configuration, droplet generation relies on the fact that an electric field can change the interfacial energy between a fluid and the surface it is in contact with. Since interfacial energy directly affects the contact angle, an electrical field can be used to reduce the contact angle and cause the fluid to wet the surface. In essence, the hydrophilicity of an area can be temporarily increased around the fluid stream. EWOD devices can be fabricated as either a one-plane or two-plane device. In a two-plane device, the ground electrode is typically placed on the top layer with the control electrodes on the bottom. Both layers include an insulating layer separating the droplets from the electrodes. Activation of the electrodes initiates fluid wetting of the channel and the fluid quickly begins to form a short liquid finger between the electrodes. The electrodes are then switched off, reverting the surface to being hydrophobic. This causes the finger to break off from the reservoir, and form a droplet. The size of the droplet is dependent on the electric field strength, frequency of the applied field, and width of the channel opening.

A flow-focusing device or configuration is preferred for the microfluidic droplet-generating region, in some variations (e.g., see FIG. 1).

Preferably, both the first fluid and second fluid enter the droplet-generating region as continuous phases. Within the droplet-generating region, the first fluid is changed from a continuous phase to a dispersed phase (with a plurality of droplets), since the first and second fluids are not completely miscible. The second fluid typically remains a continuous phase within the droplet-generating region. In certain embodiments, at least some of the second fluid forms a second dispersed phase in the droplet-generating region, the first dispersed phase being that of the first fluid.

The microfluidic droplet-generating region preferably generates droplets of the dispersed phase of the first fluid that are uniform in size. The average droplet size may be from about 1 micron to about 500 microns in diameter, for example, with a standard deviation of less than 50%, less than 25%, less than 10%, less than 5%, or less than 1% of the average droplet size. The droplet size needs to be large enough to contain multiple particles, such as at least 2, 5, 10, 50, 100, 500, $10^3$, $10^4$, $10^5$, or $10^6$ particles per droplet. The concentration of particles is uniform throughout the first fluid. Therefore, each of the droplets contains a similar number of particles, such as a standard deviation of less than 50%, less than 25%, less than 10%, less than 5%, or less than 1% of the average number of particles per droplet.

The flow rate of the first fluid into the first inlet may be selected from about 0.1 to about 100 microliters/min, such as from about 1 to about 10 microliters/min, for example. The flow rate of the second fluid into the second inlet may be selected from about 1 to about 1000 microliters/min, such as from about 10 to about 100 microliters/min. for example. The flow rates of first and second fluids are preferably tuned to avoid droplet coalescence within the droplet-generating region or within the droplet-dissolving region. When droplet coalescence is a concern, the flow rate of the first fluid should typically be lower than the flow rate of the second fluid, so that there are longer separation distances between individual droplets. For example, in various embodiments, the ratio of the volumetric flow rate of the first fluid to the volumetric flow rate of the second fluid is less than 1:1, 1:2, 1:10, 1:20, 1:50, or 1:100.

In certain embodiments, the first inlet is configured with a filter that removes a portion of the particles contained in the first fluid. Filtering out some of the particles (but not all of the particles) may be done to control particle size, to remove pre-agglomerated particles, or for other reasons. The second inlet and any additional inlets (e.g., a third inlet) may also be configured with filters to remove some or all solids from the second fluid, if desired.

Additional fluids (besides first and second fluids) may be introduced to the droplet-generating region. For example, the droplet-generating region may be configured to bring together multiple types of fluids inside a single droplet. These multiple fluids may be mixed prior to droplet formation, after droplet formation, or both prior to and after droplet formation. Multiple fluids may be introduced in the first inlet or there may be additional inlets, other than the first and second inlets, for feeding additional fluids. In some embodiments, the first fluid contains the particles and solvent, while an additional fluid contains a pH-adjustment substance, such as an acid or a base. The additional fluid may contain the same solvent as in the first fluid, a different solvent, or no solvent (e.g., the additional fluid may consist of the pH-adjustment substance).

The microfluidic droplet-generating region may be made using any standard microfluidic fabrication method. See, for example, Iliescu et al., "A practical guide for the fabrication of microfluidic devices using glass and silicon" *Biomicrofluidics* 2012 Mar. 6 (1): 016505-016505-16, which is hereby incorporated by reference herein. Molded polymers (e.g. polydimethylsiloxane, polymethylmethacrylate, polycarbonate, and cyclic olefin copolymers); wet-etched, dry-etched, and/or plasma-etched glass; wet-etched, dry-etched, and/or plasma-etched silicon; molded glass; laser-cut, patterned glass; micro-sandblasted glass, and other materials may be used to fabricate the microfluidic droplet-generating region. Flow-focusing channels may be fabricated using various methods including soft lithography or the insertion of capillary sheathes into microdevices, for example.

The microfluidic regions may also be made by additively manufacturing (e.g. via stereolithography) a sacrificial pattern for the microfluidic passages, conformally coating the passages (e.g., with parylene) or infiltrating with a bulk material, and then selectively removing the sacrificial pattern (e.g. by chemical etching, such as with NaOH). See Roper et al. "Scalable 3D Bicontinuous Fluid Networks: Polymer Heat Exchangers Toward Artificial Organs" *Adv. Mater.* 2015, which is hereby incorporated by reference, for details on this technique to make microfluidic regions.

The droplet-dissolving region is configured for dissolving-droplet assembly of particles, which is synonymous with shrinking-droplet assembly of nanoparticles. The droplet-dissolving region may also be referred to as a dissolution region.

The droplets that are generated in the droplet-generating region are transported to the droplet-dissolving region. The droplet transport is preferably via continuous flow (e.g., see FIG. 5), but may alternatively be via intermittent flow, semi-continuous flow, or in a batch process. In a batch process, a number of droplets may be formed, collected, and then introduced into the droplet-dissolving region. In certain embodiments, the droplet transport is achieved through the air or another gas to the droplet-dissolving region, driven by gravity or by generation of a mist using a pump, for example.

The droplet-dissolving region preferably contains a third fluid. The third fluid may be an alcohol, an ester (e.g., an aliphatic ester, such as but not limited to methyl laurate), a ketone, an alkane, or a cyclic alkane, for example. In some embodiments, the third fluid is selected from the group consisting of methyl laurate, 1-butanol, t-butanol, 1-octanol, 1-hexanol, 1-decanol, ethyl ether, dibutyl ether, dihexyl ether, dioctyl ether, methyl t-butyl ether, methyl ethyl ketone, methyl amyl ketone, cyclohexane, ethyl acetate, and combinations thereof. Preferably, the third fluid is at least partially soluble in the second fluid, and more preferably the third fluid is completely miscible with the second fluid. In some embodiments, the third fluid has the same composition as the second fluid.

The first fluid is neither fully miscible nor completely insoluble with the third fluid. That is, the first fluid is slightly soluble in the third fluid. The first fluid is preferably from about 0.01 vol % to about 20 vol % soluble in the third fluid, more preferably from about 0.1 vol % to about 15 vol % soluble in the third fluid, and most preferably from about 1 vol % to about 10 vol % soluble in the third fluid. These percentages are on a volume/volume basis, i.e. calculated as the volume of the first fluid that dissolves in a given volume of the third fluid.

In the droplet-dissolving region, some or all of the droplets dissolve into the third fluid. Preferably, all of the droplets dissolve into the third fluid, which requires the total volume of all droplets to not exceed the volumetric solubility of the first fluid in the combination of the second fluid and third fluid in the droplet-dissolving region. The first fluid is preferably from about 0.01 vol % to about 20 vol %, more preferably from about 0.1 vol % to about 15 vol %, and most preferably from about 1 vol % to about 10 vol % soluble in the combined second and third fluids. These percentages are on a volume/volume basis, i.e. calculated as the volume of the first fluid that dissolves in a given volume of the combined second and third fluids present in the droplet-dissolving region.

The dissolution of droplets in the droplet-dissolving region may be accomplished by diffusion, convection, or a combination thereof. In some embodiments, the droplet-dissolving region is configured for gentle agitation, such as with stirring, shaking, rolling, sonication, or a combination thereof. When agitation is employed, the degree of agitation should be high enough to promote convection and dissolution (and avoid agglomeration), but not so high to shear the droplets into finer droplets, which would redistribute the particles and increase the assembly dispersity index (defined below) in the final microassemblies. Note that the droplet-dissolving region is not limited to the laminar flow regime.

The droplets preferably do not coalesce in the droplet-dissolving region, or between the droplet-generating region and the droplet-dissolving region. Preventing droplet coalescence may be achieved by (1) introducing a surfactant or other interface-stabilization substance, (2) increasing droplet spacing via adjusting relative flow rates of the second fluid to the first fluid, (3) minimizing abrupt flow speed reductions (e.g. flow expansions) between the droplet-generating region and the droplet-dissolving region, and/or (4) flowing the third fluid past the injection location of the droplets into the third fluid so that droplets are quickly moved away from the injection location.

An optional interface-stabilization substance may be included in the first fluid and/or the second fluid, or may be separately introduced to the droplet-generating region. It is preferable to include the interface-stabilization substance, when present, in the second fluid. In the droplet-generating region, the interface-stabilization substance segregates to interfaces between the first fluid and the second fluid. The interface-stabilization substance may be selected from cationic, anionic, zwitterionic, or nonionic surfactants. In preferred embodiments, the interface-stabilization substance is a nonionic surfactant (e.g., polyglycerol alkyl ethers, polyoxyethylene alkyl ethers, or polysorbates). In some embodiments, the interface-stabilization substance is selected from particles, such as functionalized particles (e.g., $Fe_3O_4$ particles functionalized with polyacrylic acid).

In some embodiments, the device, or a portion thereof, is in thermal communication with a temperature-control component, which may be a cooler, a heater, or a unit (e.g., a heat exchanger) capable of either cooling or heating. The temperature-control component allows fluids to be cooled or heated to adjust their solubility. The temperature-control component may be configured in thermal communication with the droplet-generating region, the first inlet, the second inlet, the droplet outlet, droplet-dissolving region, or more than one of these regions. Multiple temperature-control components may be in thermal communication with the device. As one example, an emulsion may be created at low temperature (via cooling) in the droplet-generating region, and then in the droplet-dissolving region, heating is applied to tune the dissolution rate. In some embodiments, at least one of the first fluid, second fluid, and third fluid, preferably at least two of these fluids, and more preferably all of these fluids, are independently controlled by one or more temperature-control components. The temperatures of the first fluid, second fluid, and third fluid may be independently controlled to be, for example, about 0° C., 5° C., 10° C., 15° C., 20° C., 25° C., 30° C., 35° C., 40° C., or higher. In some embodiments, the temperatures of the first fluid and the second fluid are both controlled to be lower than the temperature of the third fluid.

FIG. 1 is a schematic diagram of a microfluidic device 100 for assembling a plurality of particles into particle assemblies, in some embodiments. In FIG. 1, a first fluid contains particles 101 dissolved or suspended in a solvent 102. In a droplet-generating region, there is a first inlet 103 configured to feed the first fluid, a second inlet 104 configured to feed a second fluid, and a third inlet 105 also configured to feed the second fluid. The first inlet 103 is perpendicular to the second inlet 104, and the second inlet 104 and third inlet 105 are parallel and disposed on opposite sides of the droplet-generating region. In the droplet-generating region, droplets 106 are formed. The droplets 106 contain particles 101 and solvent 102, and the droplets 106 are surrounded by second fluid 107. There is a droplet outlet 108 from the droplet-generating region, configured to withdraw droplets 106 and to convey them to a droplet-dissolving region. In the droplet-dissolving region, there is a third fluid 110 that surrounds dissolving droplets 109 (the solvent 102 contained in droplets 106 is transported out of the dissolving droplets 109, as depicted by the outward arrows in FIG. 1). After a period of time 111, and/or following conveying 111 the dissolving droplets 109 and third fluid 110 to another container, there is at least one assembly 112 contained within a liquid mixture 113 of solvent, second fluid, and third fluid. The assemblies 112 may be recovered from liquid mixture 113 such as by filtering, centrifuging, drying (e.g., evaporation of liquid phase), or other recovery steps.

Figure 2:
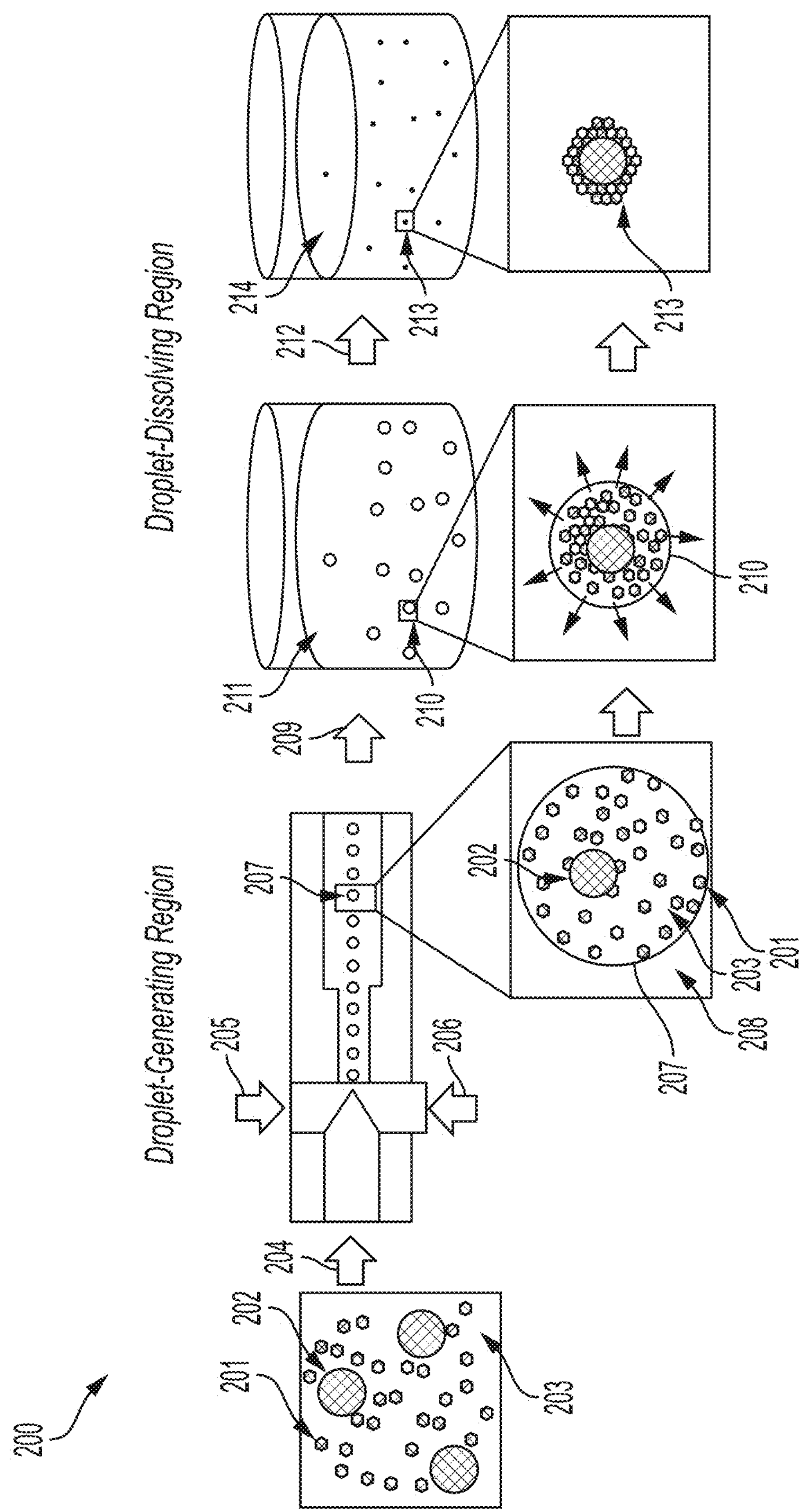
FIG. 2 is a schematic diagram of a microfluidic device for assembling a plurality of particles into core-shell particle assemblies, in some embodiments.

FIG. 2 is a schematic diagram of a microfluidic device 200 for assembling a plurality of particles into core-shell particle assemblies, in some embodiments. In FIG. 2, a first fluid contains nanoparticles 201 dissolved or suspended in a solvent 203, along with microparticles 202 dissolved or suspended in solvent 203. The microparticles 202 may be homogeneous particles or may themselves be microassemblies previously made and introduced to the first fluid, for example. In a droplet-generating region, there is a first inlet 204 configured to feed the first fluid, a second inlet 205 configured to feed a second fluid, and a third inlet 206 also configured to feed the second fluid. In the droplet-generating region, droplets 207 are formed. The droplets 207 contain nanoparticles 201, microparticles 202, and solvent 203, and the droplets 207 are surrounded by second fluid 208. There is a droplet outlet 209 from the droplet-generating region, configured to withdraw droplets 207 and to convey them to a droplet-dissolving region. In the droplet-dissolving region, there is a third fluid 211 that surrounds dissolving droplets 210 (the solvent 203 contained in droplets 207 is transported out of the dissolving droplets 210, as depicted by the outward arrows in FIG. 2). After a period of time 212, and/or following conveying 212 the dissolving droplets 210 and third fluid 211 to another container, there is at least one core-shell assembly 213 contained within a liquid mixture 214 of solvent, second fluid, and third fluid. The core-shell assemblies 213 may be recovered from liquid mixture 214 such as by filtering, centrifuging, drying, or other recovery steps.

Figure 3:
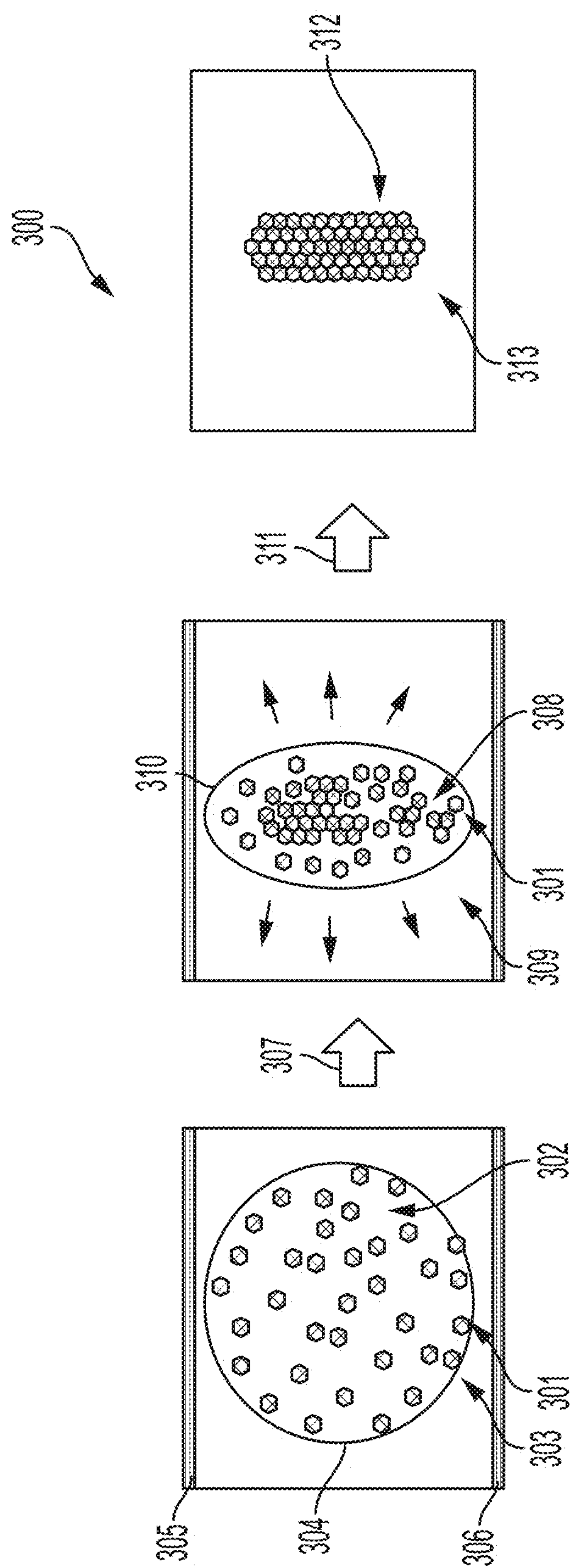
FIG. 3 is a schematic diagram of a microfluidic device for assembling a plurality of particles into elongated microassemblies through one-dimensional confined droplet dissolution, in some embodiments.

FIG. 3 is a schematic diagram of a microfluidic device 300 for assembling a plurality of particles into elongated microassemblies through one-dimensional confined droplet dissolution, in some embodiments. In FIG. 3, a droplet 304 contains a first fluid of particles 301 dissolved or suspended in a solvent 302. The droplet 304 is surrounded by a second fluid 303. A first flat plate 305 and a second flat plate 306 confine the droplet 304. After a period of time 307, and/or following conveying 307 the droplet 304 to another container, the droplet 310 begins to elongate, due to the dimensional constraints imposed by flat plates 305 and 306. The solvent 302 contained initially in droplet 304 is transported out of the dissolving droplet 310, as depicted by the outward arrows in FIG. 3, into solution 309. A liquid phase 308 remains in the dissolving droplet 310 until the microassembly 312 is formed. After a period of time 311, and/or following conveying 311 the dissolving droplet 310 to another container, an elongated microassembly 312 is formed, contained in a liquid mixture 313 that is a mixture of solvent 302 and second fluid 303 (and potentially other fluids). The elongated microassembly 312 may be recovered from liquid mixture 313 such as by filtering, centrifuging, drying, or other recovery steps.

Figure 4:
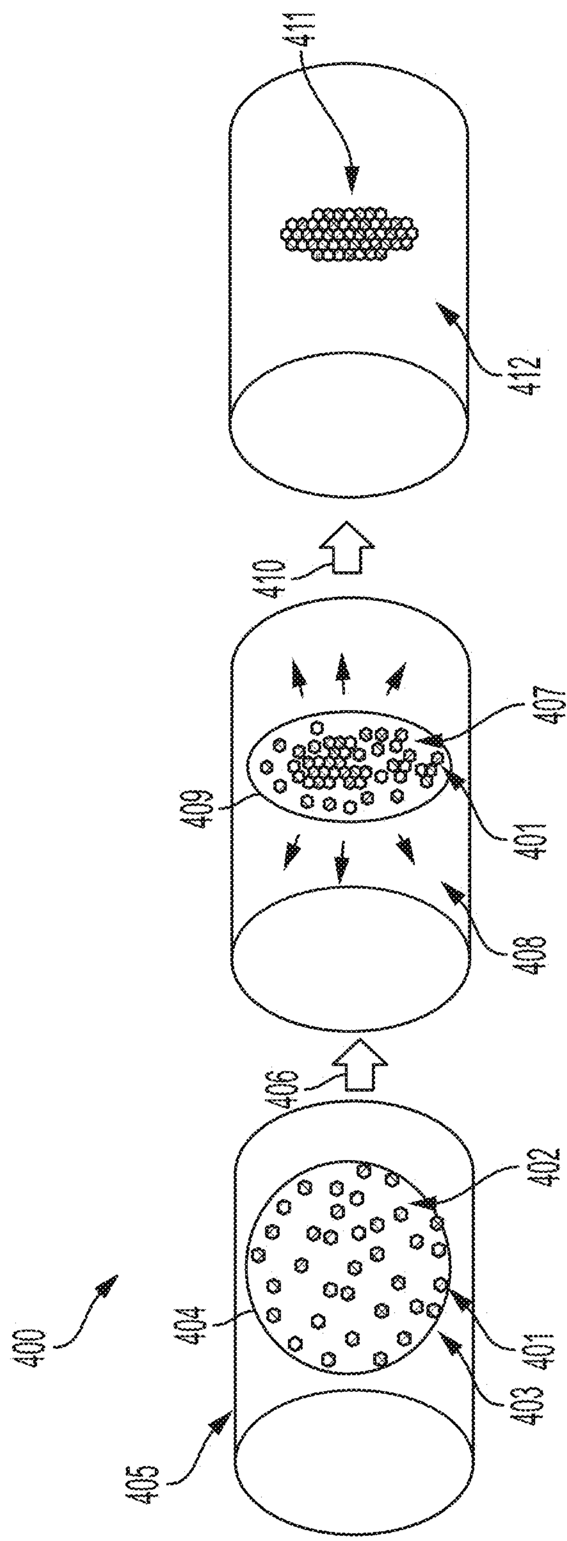
FIG. 4 is a schematic diagram of a microfluidic device for assembling a plurality of particles into biconvex lens-shaped microassemblies through two-dimensional confined droplet dissolution, in some embodiments.

FIG. 4 is a schematic diagram of a microfluidic device 400 for assembling a plurality of particles into biconvex lens-shaped microassemblies through two-dimensional confined droplet dissolution, in some embodiments. In FIG. 4, a droplet 404 contains a first fluid of particles 401 dissolved or suspended in a solvent 402. The droplet 404 is surrounded by a second fluid 403. A tubular geometry 405 confines the droplet 404. After a period of time 406, and/or following conveying 406 the droplet 404 to another container, the droplet 409 begins to elongate and form convex regions (that is, interior angles less than 180°) on opposite sides, due to the dimensional constraints imposed by tubular geometry 405. The solvent 402 contained initially in droplet 404 is transported out of the dissolving droplet 409, as depicted by the outward arrows in FIG. 4, into solution 408. A liquid phase 407 remains in the dissolving droplet 409 until the microassembly 411 is formed. After a period of time 410, and/or following conveying 410 the dissolving droplet 409 to another container, a biconvex lens-shaped microassembly 411 is formed, contained in a liquid mixture 412 that is a mixture of solvent 402 and second fluid 403 (and potentially other fluids). The biconvex lens-shaped microassembly 411 may be recovered from liquid mixture 412 such as by filtering, centrifuging, drying, or other recovery steps.

Figure 5:
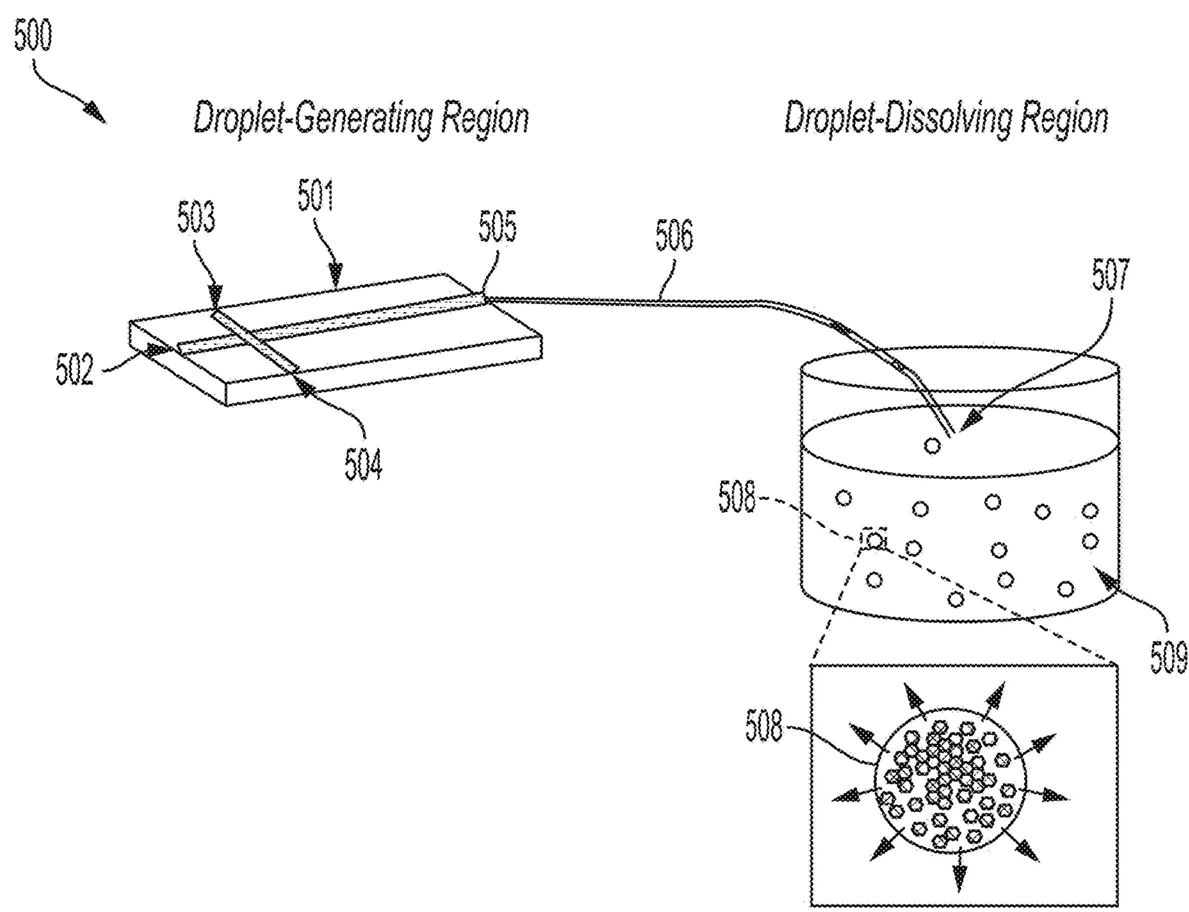
FIG. 5 is a schematic diagram of a continuous-flow microfluidic device for assembling a plurality of particles into particle assemblies, in some embodiments.

FIG. 5 is a schematic diagram of a continuous-flow microfluidic device 500 for assembling a plurality of particles into particle assemblies, in some embodiments. In a droplet-generating region, there is a first inlet 502 configured to feed a first fluid, a second inlet 503 configured to feed a second fluid, and a third inlet 504 also configured to feed the second fluid. Flow channels for first and second fluids, and for droplets 508, are fabricated within a platform 501. There is a droplet outlet 505 from the droplet-generating region, configured to continuously withdraw droplets 508 and to convey them through a flow channel 506 to an inlet 507 of a droplet-dissolving region. In the droplet-dissolving region, there is a third fluid 509 that surrounds dissolving droplets 508. The droplet-dissolving region is preferably agitated. The solvent contained in droplets 508 is transported out, as depicted by the outward arrows in FIG. 5, eventually resulting in at least one assembly of particles. The assemblies may be recovered from liquid mixture 509 such as by filtering, centrifuging, drying, or other recovery steps.

There are a number of variations of the invention, some of which will now be further described.

The first fluid may contain more than one type of particles. There may be variations in the composition and/or size of particles in the first fluid. In some embodiments, the particles are characterized by a bimodal size distribution, i.e. there are both small particles and large particles present. For example, first particles smaller than about 100 nanometers may be present, along with second particles larger than about 10 microns, both in the first fluid. In this embodiment, core-shell microassemblies of the smaller particles on the larger particles may result.

One or more of the particles may themselves be microassemblies of nanoparticles. For example, relatively large (e.g., ~10 microns or larger in size) microassemblies of first nanoparticles may be formed in a first pass through the device. These microassemblies may then be loaded along with unassembled second nanoparticles, potentially of a different composition, into the first fluid for a second pass through the device, thus forming a shell of second nanoparticles on a core of assembled first nanoparticles. This type of microassembly may be repeated to build up multiple shells.

When two types of particles are present, the pH of the first fluid may be adjusted such that the two types of particles have either opposite charge or the same charge. For example, for a desired core-shell structure, the core and shell materials may be adjusted with pH to exhibit opposite surface charges, thereby encouraging electrostatic attraction. Alternatively, for a core-shell structure, the core and shell materials may be adjusted with pH to exhibit surface charges of the same polarity, thereby inhibiting electrostatic assembly prior to droplet dissolution-driven assembly. For simultaneous assembly of multiple types of materials, the particles preferentially exhibit the same surface charges, or at least polarities, to encourage co-assembly and inhibit electrostatic assembly prior to droplet dissolution-driven assembly.

Droplets within droplets (i.e., nested droplets) may be formed. To accomplish this, multiple droplet-generating regions may be present within the device or method, nesting one or more droplets within another droplet.

Differing rates of dissolution of droplet fluids may provide more complex microassemblies, such as (but not limited to) Janus particles. For example, droplets A and B may be nested inside droplet C. Fluids may be selected such that droplets A and B dissolve into droplet C, and then droplet C dissolves into a carrier fluid, thereby producing Janus particles.

In some variations, the droplets are physically confined within the droplet-dissolving region, to generate non-spherical shapes. For example, the droplet-dissolving region may be configured to confine the droplets in one dimension, such as with a parallel-plate geometry, to create elongated or cylindrical microassemblies rather than spherical microassemblies that are normally made from unconfined droplets (e.g., see FIG. 3). In another example, the droplet-dissolving region may be configured to confine the droplets in two dimensions, such as with a tubular geometry, to create ellipsoid or biconvex lens-shaped microassemblies (e.g., see FIG. 4).

Figure 6:
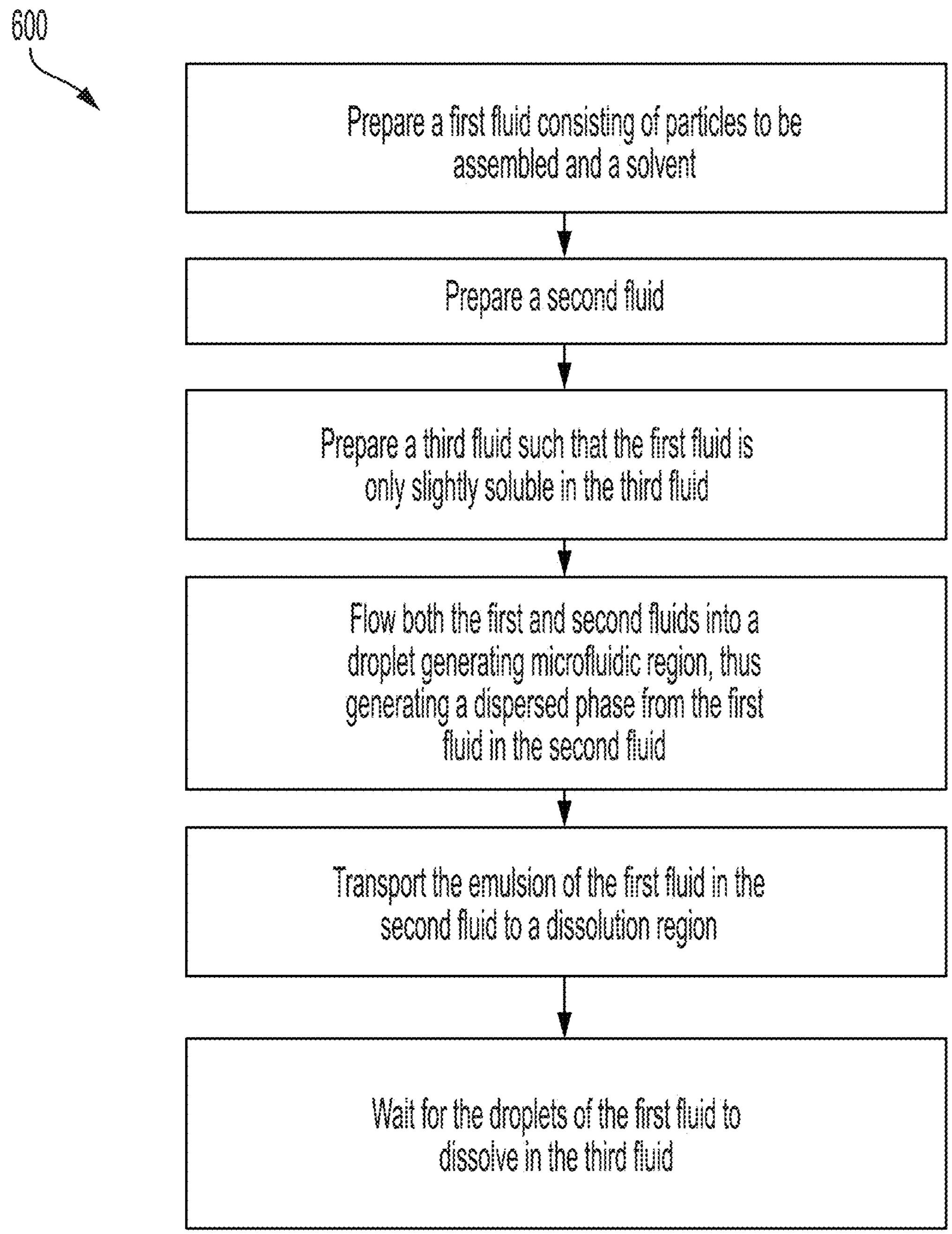
FIG. 6 is an exemplary flowchart of a method to assemble particles into a particle assembly.

Methods are also provided in some variations, which may utilize a device as described above, or another device. See FIG. 6, which is an exemplary method flowchart of the particle assembly, in some variations.

In some variations, the present invention provides a method of assembling a plurality of particles into particle assemblies, the method comprising:

(a) obtaining a first fluid containing particles and a solvent for the particles;

(b) obtaining a second fluid, wherein the first fluid is not fully miscible in the second fluid;

(c) obtaining a third fluid, wherein the first fluid is partially soluble in the third fluid;

(d) introducing the first and second fluids into a microfluidic droplet-generating region, thereby generating an emulsion containing a dispersed phase of droplets of the first fluid in the second fluid;

(e) introducing the emulsion to a droplet-dissolving region containing the third fluid; and (f) dissolving the solvent from the droplets into the third fluid, thereby forming particle assemblies.

A first fluid is prepared, wherein the first fluid contains particles to be assembled and a solvent for the particles. Electrostatic repulsion, Brownian motion, sonication, bulk mixing (e.g., agitation or vessel rotation), and/or gas sparging, for example, may be used to keep the particles suspended in the solution of the first fluid.

The particles may be dispersed in the first fluid by adjusting the pH to increase the zeta potential. Preferably, the particles in the first fluid exhibit a zeta potential of at least ±15 mV. In this disclosure, the notation "±15 mV" (for example) in reference to zeta potential means that the zeta potential is 15 mV in magnitude (absolute value) and may be either +15 mV or −15 mV; this does not refer to a range of values between −15 mV to 15 mV. A zeta potential of at least ±15 mV means the zeta potential is either +15 mV, or greater, or −15 mV, or more negative.

The zeta potential of the particles may be adjusted with pH. In some embodiments, the pH is adjusted to a value that is at least ±3 pH units away from the isoelectric point of the particles to be suspended or dissolved. In these or other embodiments, the zeta potential of the particles may be adjusted with a miscible solvent to encourage better dissolution or suspendibility.

A second fluid is prepared, wherein the second fluid is only slightly soluble in the first fluid or completely insoluble in the first fluid. A third fluid is prepared, wherein the first fluid is only slightly soluble in the third fluid. The second fluid may be fully soluble in the third fluid, or the second fluid may be slightly soluble in the third fluid.

The first and second fluids are introduced (such as by liquid flow or by dropping the droplets through air) into a microfluidic droplet-generating region, thereby generating a dispersed phase of the first fluid within the second fluid (i.e., an emulsion). This emulsion is conveyed from the droplet-generating region to the droplet-dissolving region. The third fluid is added to the droplet-dissolving region, preferably prior to introduction of the emulsion. Alternatively, or additionally, the third fluid may be added to the droplet-dissolving region during and/or following introduction of the emulsion to the droplet-dissolving region.

The solvent contained in droplets of first fluid is then dissolved into the third fluid, leaving the particles behind. As solvent leaves, the particles begin to assemble, eventually forming particle assemblies from all of the particles that were initially contained in the droplets.

The fluid phase of the droplet-dissolving region may be agitated to speed up the dissolution of solvent into third fluid. Also, agitation of the droplet-dissolving region can help keep the emulsion droplets discrete (not agglomerated) until the first fluid has fully diffused into the continuous phase (third fluid). Agitation may be accomplished via stirring, shaking, rolling, sonication, or a combination thereof, for example.

The time period for dissolution may be from about 1 second to about 10 hours, such as from about 30 seconds to 10 minutes, for example. In various embodiments, the time period for dissolution is about 10 seconds, 30 seconds, 1 minute, 2 minutes, 5 minutes, 10 minutes, 30 minutes, 1 hour, 2 hours, 3 hours, 4 hours, 6 hours, or 8 hours.

The dissolution may be conducted at a dissolving temperature from about −15° C. to about 150° C. In various embodiments, the method employs a dissolving temperature of about −10° C., −5° C., 0° C., 5° C., 10° C., 15° C., 20° C., 25° C., 30° C., 40° C., 50° C., 60° C., 70° C., 80° C., 90° C., 100° C., 110° C., 120° C., 130° C., or 140° C. The dissolving temperature may be as low as a temperature just above the freezing point of the fluid mixture. Optionally, a temperature profile is utilized, with increasing or decreasing temperature to adjust solubility properties. The dissolving temperature may be lower or higher than other temperatures, such as the temperature in the droplet-generating region.

In some embodiments, steps (d), (e), and (f) are continuous. In other embodiments, steps (d), (e), and (f) are conducted in batch. Combinations are possible, including semi-continuous, semi-batch, or a method in which one or more steps are done in batch while one or more steps are performed continuously. As one example, steps (d) and (e) could be a batch process to make the emulsion and combine it with the third fluid, creating an intermediate mixture. The intermediate mixture could then be continuously fed to a droplet-dissolving region to continuously form particle assemblies.

The assembly of the particles, in various embodiments, is characterized by an assembly rate (particles assembled per second) of about $10^6$, $10^7$, $10^8$, $10^9$, $10^{10}$, $10^{11}$, $10^{12}$ particles/second or higher.

The particle assemblies are optionally separated from the solution, such as by centrifugation or filtration, for example. The particle assemblies are optionally dried to remove any residual fluid. Drying may be performed with heat and/or a vacuum. In some embodiments, the particle assemblies are freeze-dried.

In some embodiments, in step (f), the number of particle assemblies equals the number of droplets. If the initial droplets all contain the same particle mass, then the final particle assemblies are expected to be nearly monodisperse, i.e. an assembly dispersity index close to or at 0. As used herein, the "assembly dispersity index" is the ratio of standard deviation of assembly volume to the mean of the assembly volume, calculated over all assemblies present. In some embodiments, the assembly dispersity index of the particle assemblies is less than 0.2, preferably less than 0.1, and more preferably less than 0.05.

Some variations of the invention provide an assembly of nanoparticles, wherein the assembly has a volume from 1 $\mu m^3$ to 1 $mm^3$, a packing fraction from 20% to 100%, and/or an average relative surface roughness less than 5%.

The "packing fraction" (or packing density) of an assembly is the fraction of the total assembly volume occupied by the particles in the assembly. In some embodiments, the assembly packing fraction is at least 90%. In various embodiments, the assembly packing fraction is about 25%, 30%, 35%, 40%, 45%, 50%, 55%, 60%, 65%, 70%, 75%, 80%, 85%, 90%, 95%, 99%, or 100%. The packing fraction is 100% minus the void (volume) density, i.e., tighter packing means fewer voids, and conversely, lower-density packing means a greater density of voids (open space).

"Relative surface roughness" is defined as a ratio of the size of a protrusion on the surface to the diameter of the assembly. The assembly diameter may be the effective diameter, i.e. the cube root of the volume of the assembly if the diameter is not well-defined. Preferably, the relative surface roughness is less than 10 particle diameters divided by the assembly diameter, more preferably less than 3 particle diameters divided by the assembly diameter, and most preferably less than 1 particle diameter divided by the assembly diameter. The average relative surface roughness accounts for variations in protrusion sizes, averaged across the entire surface of the assembly. In preferred embodiments, the average relative surface roughness of the assembly is less than 5%, which may be characterized as a "smooth" assembly surface. In various embodiments, the average relative surface roughness of the assembly is about, or less than about, 5%, 4%, 3%, 2%, 1%, 0.5%, or 0.1%.

The assembly may be spherical or non-spherical. In some embodiments, the assembly has an aspect ratio of at least 1.2. The aspect ratio is defined as the ratio of the maximum assembly dimension to the minimum assembly dimension. In various embodiments, the assembly has an aspect ratio of about 1.0, 1.1, 1.2, 1.3, 1.4, 1.5, 1.6, 1.7, 1.8, 1.9, 2.0, or greater. As an example, the assembly may be a biconvex ellipsoid with one axis at least 1.2 times another axis. As another example, the assembly may be a cylinder with a length that is at least 2 times the diameter.

The assembly may have a volume from about 1 $\mu m^3$ to about 1 $mm^3$ ($10^9$ $\mu m^3$) for example. In some embodiments, the assembly has a volume from about 8 $\mu m^3$ to about $8\times10^6$ $\mu m^3$. When there are multiple assemblies, there may be a range of assembly volumes with the average assembly volume being from about 1 $\mu m^3$ to about 1 $mm^3$, for example.

The assembly dispersity index of the particle assemblies may be less than 0.5, 0.4, 0.3, 0.2, 0.1, 0.05, 0.02, or 0.01, including 0 (perfecting monodisperse assemblies). In some preferred embodiments, the assembly dispersity index of the particle assemblies is less than 0.1.

If the particles of the assembly are asymmetric, the long axes of individual particles are preferably aligned in the same direction with respect to one another in the arrays. "Aligned" means the long axis of the particles have a full width at half maximum angular distribution with respect to the array alignment direction of at most ±20°, and more preferably at most ±10°.

In some embodiments, the particles are packed together and touching or near touching in an assembly array. The center-to-center distance between particles may be less than the width of two particles. More preferably, the center-to-center distance between particles may be less than the width of 1.5 nanoparticles.

In various embodiments, the assembly contains a material selected from the group consisting of metals, metal oxides, metal fluorides, metal sulfides, metal phosphides, semiconductors, ceramics, glasses, polymers, and combinations thereof.

The assembly is preferably free of organic ligands. That is, the assembly is preferably free of ligands containing carbon, such as hydrocarbon ligands. Carbon-containing impurities may be present unintentionally within the assembly or on the assembly surface.

In some embodiments (such as fluoride-based nanoparticles), the nanoparticles may have inorganic ligands (e.g., tetrafluoroborate, $BF_4^-$ ligands) or other organic-free, positively or negatively charged ligands or hydrophilic ligands on the surface to help keep them dispersed in water. When present, the ligands may be loosely bound such that a zeta potential response with pH is observed.

Note that organic groups (including organic ligands) may be present in the fluid(s), which is distinct from the particles in bulk solution. Also, organic material (e.g., an organic polymer) may be contained within or on the particles, but preferably not as organic ligands. In some embodiments, substantially no organic material is present on or in the particles. "Substantially no organic material," "free of organic ligands," and like terminology should be construed to recognize that there may be impurities or other species unintentionally present in these material assemblies, which do not significantly impact the properties of the material assemblies.

The assembly is preferably not disposed on a substrate. In this context, a "substrate" means an initial, stationary solid surface (e.g., a platform) on which the particles deposit during the assembly process. Preferred embodiments (such as FIGS. 1 to 6) do not utilize a substrate for the assembly. Note that a previous layer of particles being assembled is not considered a substrate, and an initial microassembly (FIG. 2) onto which particles are assembled into a core-shell assembly, is also not considered a substrate, since the microassembly is not stationary. In FIG. 3, the flat plates, while stationary, are not surfaces onto which particles deposit during assembly—rather, the flat plates geometrically constrain the transport paths of solvent being dissolved out of droplets. The flat plates are therefore not substrates as defined herein.

In some embodiments, the assembly of particles into an assembly via a method disclosed herein may be followed by charge-titration assembly of nanoparticles, thus creating a core-shell structure. In these or other embodiments, the assembly of particles into an assembly via a method disclosed herein may be preceded by charge-titration assembly of nanoparticles, thus creating a core-shell structure. Charge-titration assembly of nanoparticles is disclosed in commonly owned U.S. patent application Ser. No. 15/241,536, filed on Aug. 19, 2016, and commonly owned U.S. patent application Ser. No. 16/011,834, filed on Jun. 19, 2018, which are each hereby incorporated by reference herein. Charge-titrating assembly allows spatial and temporal control over the zeta potential of the particles to achieve alignment and organization of particles, without requiring organic ligands or a substrate.

Optionally, selective metal plating is performed on and/or inside each assembly. Selective metal plating may alternatively, or additionally, be performed on the particles prior to assembly. Selective metal plating may be done with gold, silver, copper, nickel, aluminum, or a combination thereof, for example. Exemplary metal plating processes include, but are not limited to, electroless deposition, electroplating, metal evaporation, sputtering, metal organic chemical vapor deposition, or light-induced deposition.

EXAMPLES

In these Examples, microassemblies are produced using a method and device of the invention.

Example 1

Production of Microassemblies

Figure 7A:
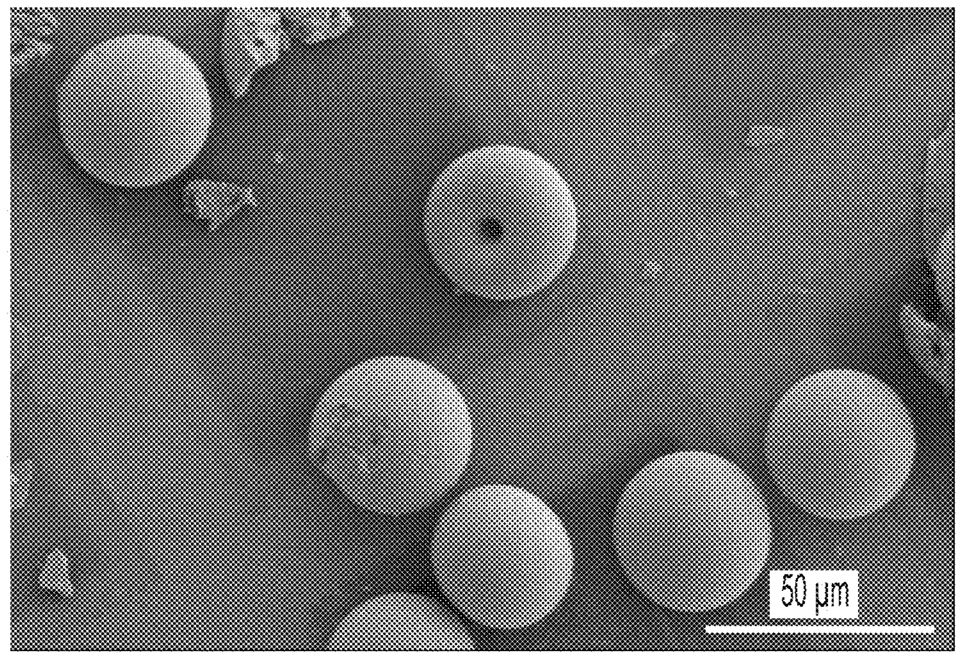
FIG. 7A (scale bar=50 μm) is a SEM image of a plurality of particle assemblies, in Example 1.

A first fluid consisting of a solution of $LiYF_4$ nanoparticles (12.5 mg/mL) in 25 vol % DMSO in water is pressurized to 1400 mbar at room temperature and fed to the central port of a flow-focusing microfluidic droplet junction. A second fluid, 1-octanol, is pressurized to 1650 mbar and fed to the top and bottom ports of the flow-focusing microfluidic droplet junction. Droplets emerge from the flow-focusing junction outlet port and are fed through a tube into a 1 L glass bottle containing 300 mL 1-octanol. The jar is slowly and continuously rotated during the droplet production. Droplets are produced until ~1 mL of the first solution is consumed. The jar is rotated for about two minutes after ceasing droplet production, while the remaining droplets in the jar dissolve. The resulting microassemblies are depicted in FIG. 7A, which is a SEM image (scale bar=50 μm) of a plurality of particle assemblies generated. The microassemblies have an average diameter of about 30 microns.

Example 2

Production of Microassemblies

Figure 7B:
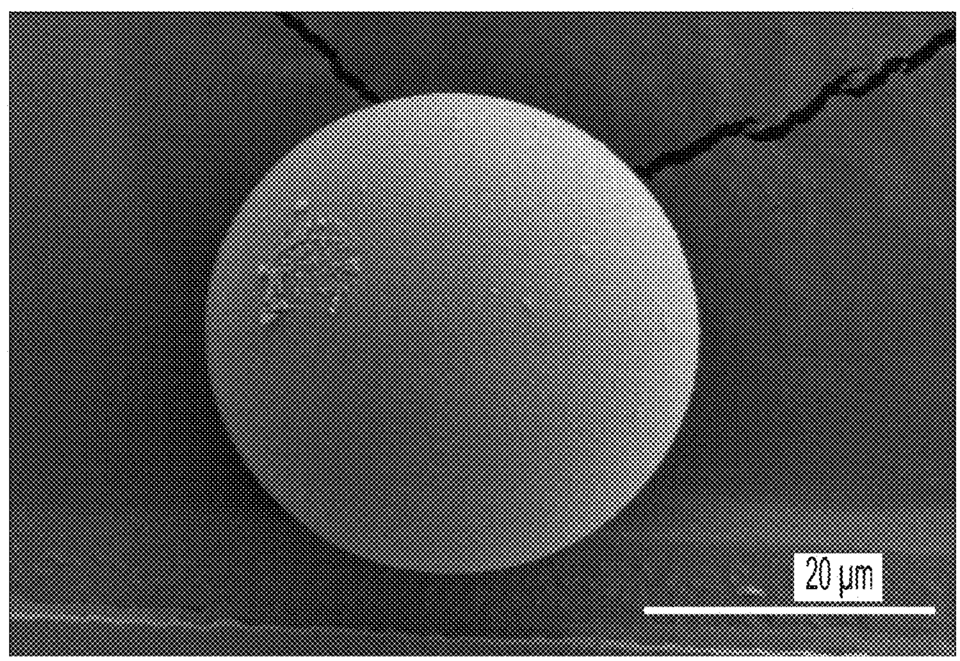
FIG. 7B (scale bar=20 μm) is a SEM image of an individual particle assembly, in Example 2.
Figure 7C:
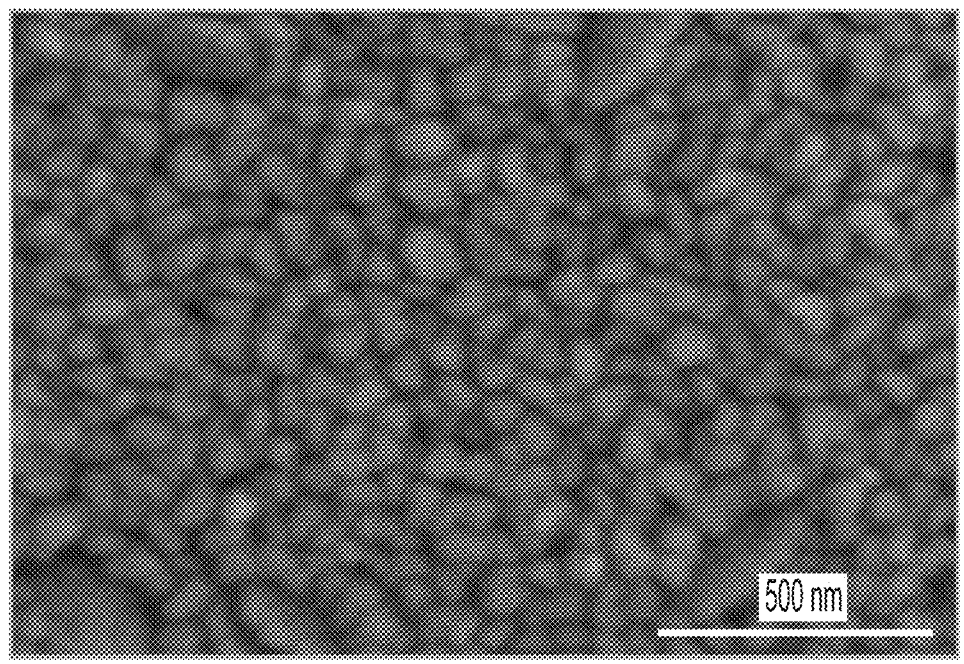
FIG. 7C (scale bar=500 nm) is a SEM image of the surface of a particle assembly, revealing the nanoparticles that are assembled into the particle assembly, in Example 2.

A first fluid consisting of a solution of $LiYF_4$ nanoparticles (12.5 mg/mL) in 25 vol % DMSO in water is pressurized to 1400 mbar at room temperature and fed to the central port of a flow-focusing microfluidic droplet junction. A second fluid, 1-octanol, is pressurized to 1620 mbar and fed to the top and bottom ports of the flow-focusing microfluidic droplet junction. Droplets emerge from the flow-focusing junction outlet port and are fed through a tube into a 0.5 L glass bottle containing 60 mL 1-octanol. The jar is slowly and continuously rotated during the droplet production. Droplets are produced until ~1 mL of the first solution is consumed. The jar is rotated for about two minutes after ceasing droplet production, while the remaining droplets in the jar dissolve. The resulting microassemblies are depicted in FIGS. 7B and 7C. FIG. 7B is a SEM image (scale bar=20 μm) of an individual particle assembly. FIG. 7C is a SEM image (scale bar=500 nm) of the surface of a particle assembly, revealing the nanoparticles that are assembled into the particle assembly. The microassembly in FIG. 7B has a diameter of about 30 microns. The nanoparticles in FIG. 7C have a range of effective diameters of about 25 nanometers to about 200 nanometers, with most particles in the range of about 50 nanometers to about 100 nanometers.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A device for assembling a plurality of particles into particle assemblies, said device comprising:

(a) a microfluidic droplet-generating region;

(b) a first inlet to said droplet-generating region, wherein said first inlet is configured to feed a first fluid containing particles and a solvent for said particles;

(c) a second inlet to said droplet-generating region, wherein said second inlet is configured to feed a second fluid that is not fully miscible with said first fluid;

(d) a droplet outlet from said droplet-generating region, wherein said droplet outlet is configured to withdraw droplets of said first fluid dispersed in said second fluid; and (e) a droplet-dissolving region configured to receive said droplets from said droplet outlet, wherein said droplet-dissolving region is configured to remove said solvent from said droplets, thereby forming particle assemblies.

2. The device of claim 1, said device further comprising a third inlet to said droplet-generating region, wherein said third inlet is configured to feed said second fluid.

3. The device of claim 1, wherein said droplet-generating region contains said first fluid and said second fluid.

4. The device of claim 3, wherein said droplet-dissolving region contains a third fluid that is different than said first fluid, and wherein said first fluid is partially soluble in said third fluid.

5. The device of claim 4, wherein said third fluid is different than said second fluid.

6. The device of claim 4, wherein said third fluid is the same as said second fluid.

7. The device of claim 1, wherein said droplet-dissolving region is configured with agitation.

8. The device of claim 1, wherein a temperature-control component is in thermal communication with said device or with a region of said device.

9. A method of assembling a plurality of particles into particle assemblies, said method comprising:

(a) obtaining a first fluid containing particles and a solvent for said particles;

(b) obtaining a second fluid, wherein said first fluid is not fully miscible in said second fluid;

(c) obtaining a third fluid, wherein said first fluid is partially soluble in said third fluid;

(d) introducing said first and second fluids into a microfluidic droplet-generating region, thereby generating an emulsion containing a dispersed phase of droplets of said first fluid in said second fluid;

(e) introducing said emulsion to a droplet-dissolving region containing said third fluid; and (f) dissolving said solvent from said droplets into said third fluid, thereby forming particle assemblies.

10. The method of claim 9, wherein said first fluid has a solubility in said second fluid from 0 vol % (completely immiscible) to about 20 vol %.

11. The method of claim 9, wherein said third fluid is different than said second fluid.

12. The method of claim 9, wherein said droplet-dissolving region is agitated.

13. The method of claim 9, wherein the temperature of said first fluid, the temperature of said second fluid, and/or the temperature of said third fluid are controlled with one or more temperature-control components.

14. The method of claim 9, wherein steps (d), (e), and (f) are continuous.

15. The method of claim 14, wherein the flow rate of said second fluid is at least ten times the flow rate of said first fluid.

16. The method of claim 9, said method further comprising adjusting pH of said first fluid, prior to step (d).

17. The method of claim 9, wherein the assembly dispersity index of said particle assemblies is less than 0.1.

18. The method of claim 9, wherein in step (f), the number of said particle assemblies equals the number of said droplets.

19. The method of claim 9, wherein said method does not utilize a substrate for said particle assemblies.

20. The method of claim 9, wherein said particles include first particles and second particles, wherein said second particles are larger than said first particles, and wherein said particle assemblies are core-shell particle assemblies.

21. An assembly of nanoparticles, wherein said assembly has a volume from 1 $\mu m^3$ to 1 $mm^3$, a packing fraction from 20% to 100%, and an average relative surface roughness less than 5%, wherein said average relative surface roughness is calculated as a ratio of size of an assembly-surface protrusion to the diameter of said assembly, averaged across the entire surface of said assembly, and wherein said assembly is not disposed on a substrate.

22. The assembly of claim 21, wherein said packing fraction is at least 90%.

23. The assembly of claim 21, wherein said average relative surface roughness is less than 1%.

24. The assembly of claim 21, wherein said assembly is spherical.

25. The assembly of claim 21, wherein said assembly has an aspect ratio of at least 1.2.

26. The assembly of claim 21, wherein said assembly is a core-shell assembly.

27. The assembly of claim 21, wherein said assembly contains a material selected from the group consisting of metals, metal oxides, metal fluorides, metal sulfides, metal phosphides, semiconductors, ceramics, glasses, polymers, and combinations thereof.

28. The assembly of claim 21, wherein said assembly is free of organic ligands.

* * * * *